United States Patent
Shaw, Jr.

(10) Patent No.: US 9,314,009 B2
(45) Date of Patent: Apr. 19, 2016

(54) FISHING POLE HOLDER ASSEMBLY

(71) Applicant: Samuel J. Shaw, Jr., Bedford, IN (US)

(72) Inventor: Samuel J. Shaw, Jr., Bedford, IN (US)

( * ) Notice: Subject to any disclaimer, the term of this patent is extended or adjusted under 35 U.S.C. 154(b) by 113 days.

(21) Appl. No.: 14/224,262

(22) Filed: Mar. 25, 2014

(65) Prior Publication Data

US 2015/0272104 A1    Oct. 1, 2015

(51) Int. Cl.
*A01K 97/10*    (2006.01)

(52) U.S. Cl.
CPC ........................ *A01K 97/10* (2013.01)

(58) Field of Classification Search
CPC ........................................ A01K 97/10
USPC ............. 43/21.2, 17, 16, 17.5; 248/514, 515, 248/538, 539
See application file for complete search history.

(56) References Cited

U.S. PATENT DOCUMENTS

| | | | | |
|---|---|---|---|---|
| 2,561,046 A * | 7/1951 | Brooks | A01K 97/10 | 248/156 |
| 2,592,306 A * | 4/1952 | Maze | A01K 97/10 | 248/514 |
| 2,599,099 A * | 6/1952 | Foiker | A01K 97/10 | 242/305 |
| 2,722,076 A * | 11/1955 | Benedetti | A01K 97/125 | 362/191 |
| 2,917,257 A * | 12/1959 | Hinchliffe | A01K 97/10 | 248/514 |
| 3,184,192 A * | 5/1965 | Hoerr | A01K 97/10 | 248/298.1 |
| 3,440,753 A * | 4/1969 | Kelley | A01K 97/125 | 43/17 |
| 3,612,454 A * | 10/1971 | Linn | A01K 97/10 | 248/156 |
| 3,879,880 A * | 4/1975 | Bailey | A01K 97/125 | 43/17 |
| 3,959,911 A * | 6/1976 | Puckett | A01K 97/125 | 43/17 |
| 4,154,015 A | 5/1979 | Holland | | |
| 4,471,554 A | 9/1984 | Heiskell | | |
| 4,739,575 A * | 4/1988 | Behrle | A01K 97/10 | 248/538 |
| 4,835,896 A | 6/1989 | Bowen | | |
| 4,877,165 A * | 10/1989 | Behrle | A01K 97/10 | 224/558 |
| 4,925,148 A | 5/1990 | Newton et al. | | |
| 5,025,583 A | 6/1991 | Langley | | |
| 5,325,620 A | 7/1994 | Reed et al. | | |
| D371,595 S | 7/1996 | Pieper et al. | | |
| 5,899,527 A | 5/1999 | Elvidge et al. | | |
| 6,409,131 B1 * | 6/2002 | Bentley | A01K 97/10 | 248/219.4 |
| 7,418,798 B2 * | 9/2008 | Barrett | A01K 97/10 | 43/21.2 |
| 2006/0218844 A1 | 10/2006 | Oliver et al. | | |

* cited by examiner

*Primary Examiner* — Darren W Ark
*Assistant Examiner* — Danielle Clerkley

(57) ABSTRACT

A fishing pole holder assembly attaches a fishing pole to a support structure so that the fishing pole is readily accessbile. The assembly includes a clamp configured for coupling to a support structure. A holding member is provided having a first end and a second end. The second end of the holding member is attached to the clamp. The holding member is tubular. The holding member includes a plurality of upper bends proximate the first end of the holding member wherein the holding member is configured to receive and support a handle of a fishing pole.

6 Claims, 4 Drawing Sheets

FISHING POLE HOLDER ASSEMBLY

BACKGROUND OF THE DISCLOSURE

1. Field of the Disclosure

The disclosure relates to fishing pole supports and more particularly pertains to a new fishing pole support for attaching a fishing pole to a support structure so that the fishing pole is readily accessbile.

SUMMARY OF THE DISCLOSURE

An embodiment of the disclosure meets the needs presented above by generally comprising a clamp configured for coupling to a support structure. A holding member is provided having a first end and a second end. The second end of the holding member is attached to the clamp. The holding member is tubular. The holding member includes a plurality of upper bends proximate the first end of the holding member wherein the holding member is configured to receive and support a handle of a fishing pole.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
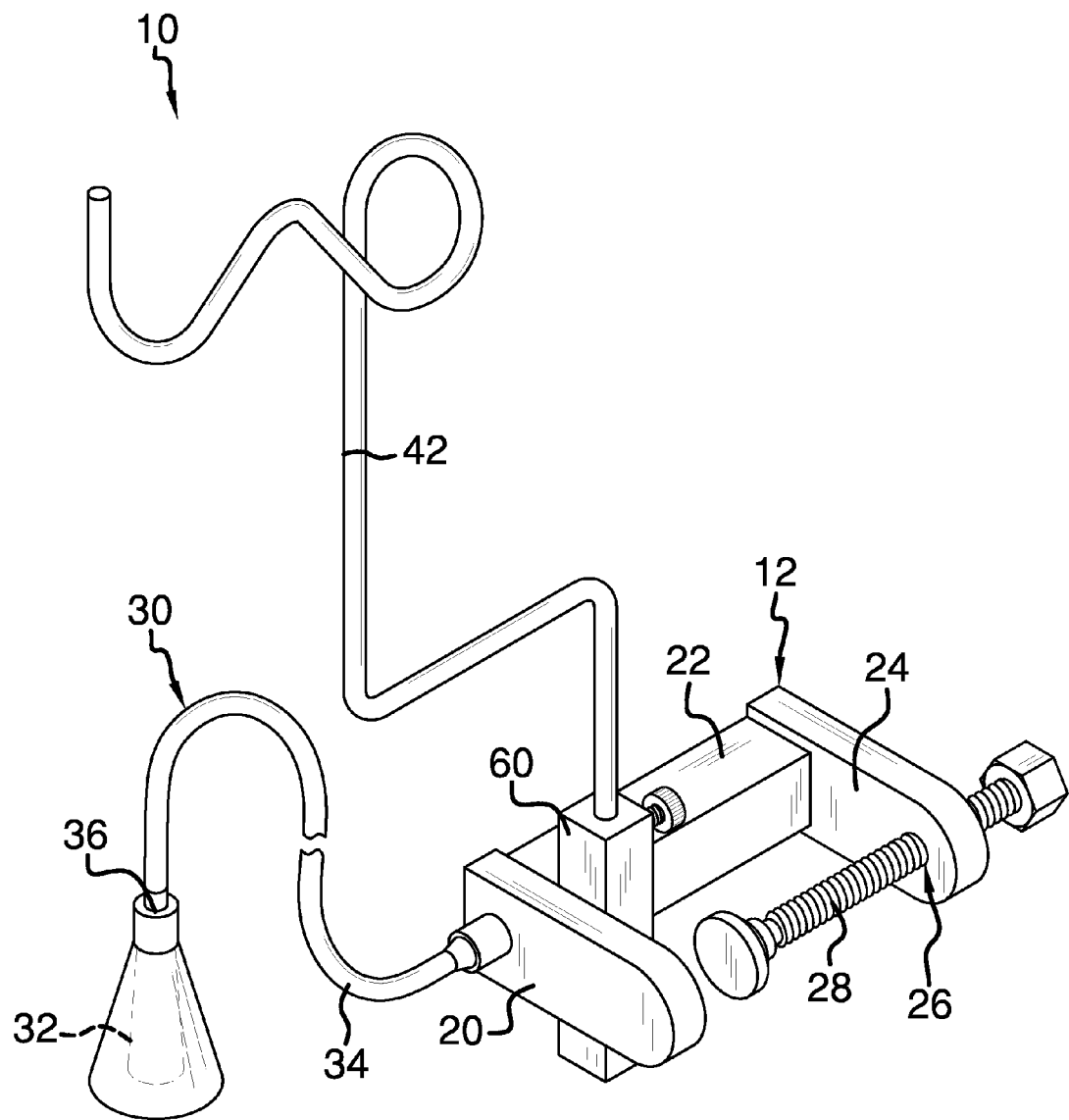
FIG. 1 is a top front side perspective view of a fishing pole holder assembly according to an embodiment of the disclosure.
Figure 2:
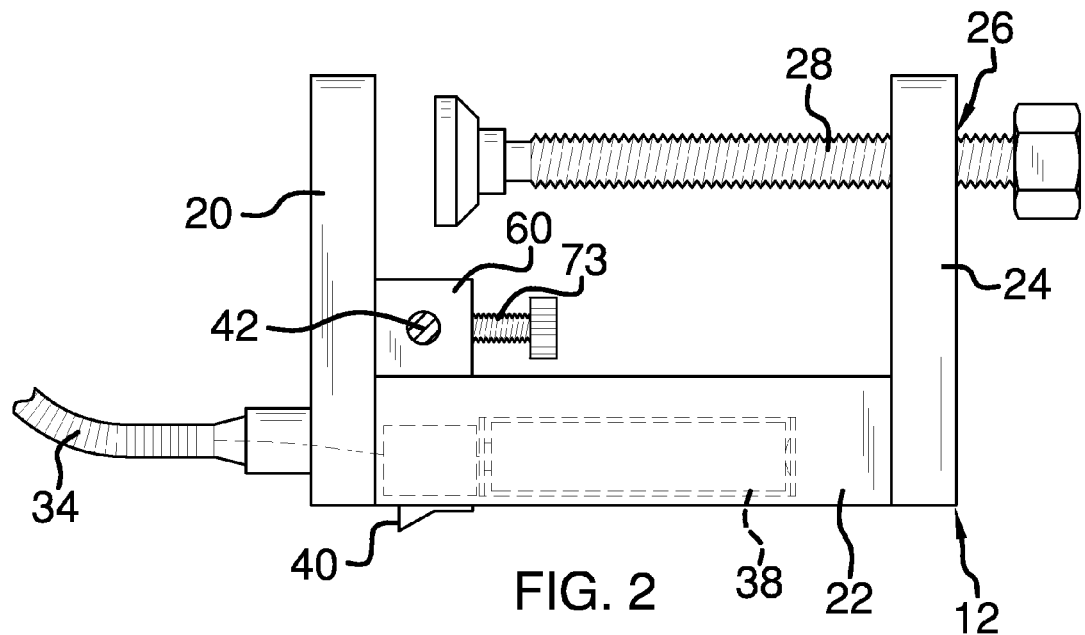
FIG. 2 is a bottom view of an embodiment of the disclosure.
Figure 3:
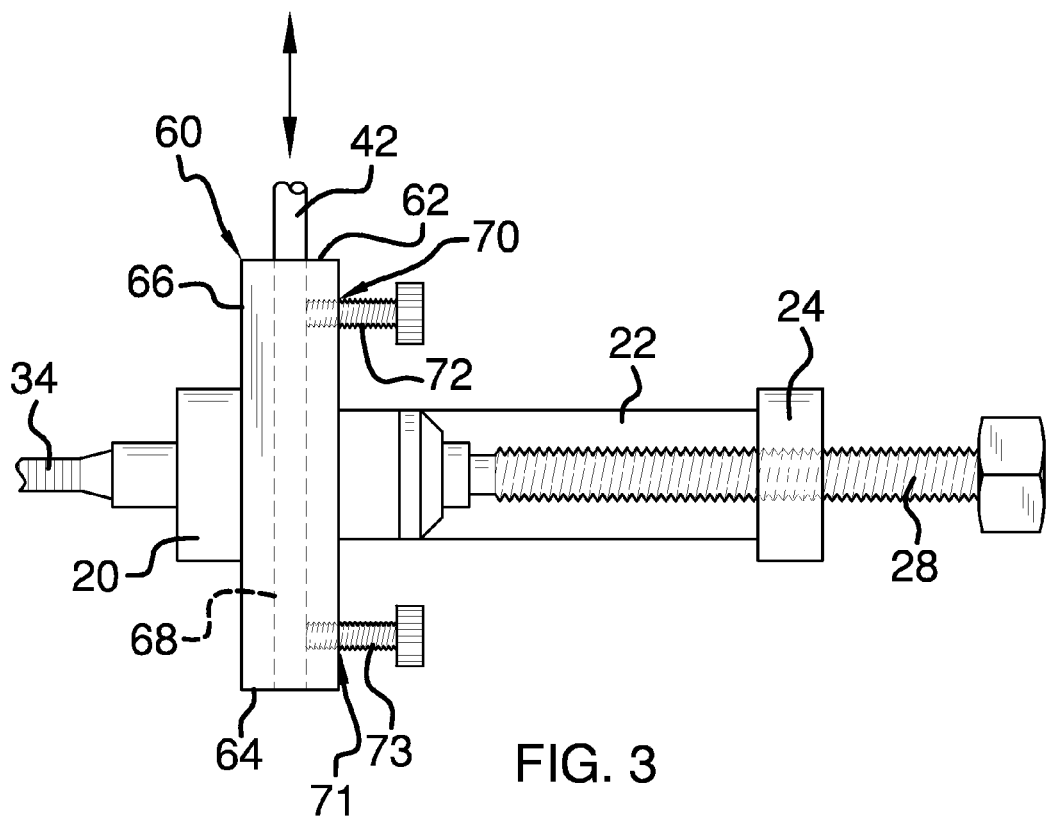
FIG. 3 is a front view of an embodiment of the disclosure.
Figure 4:
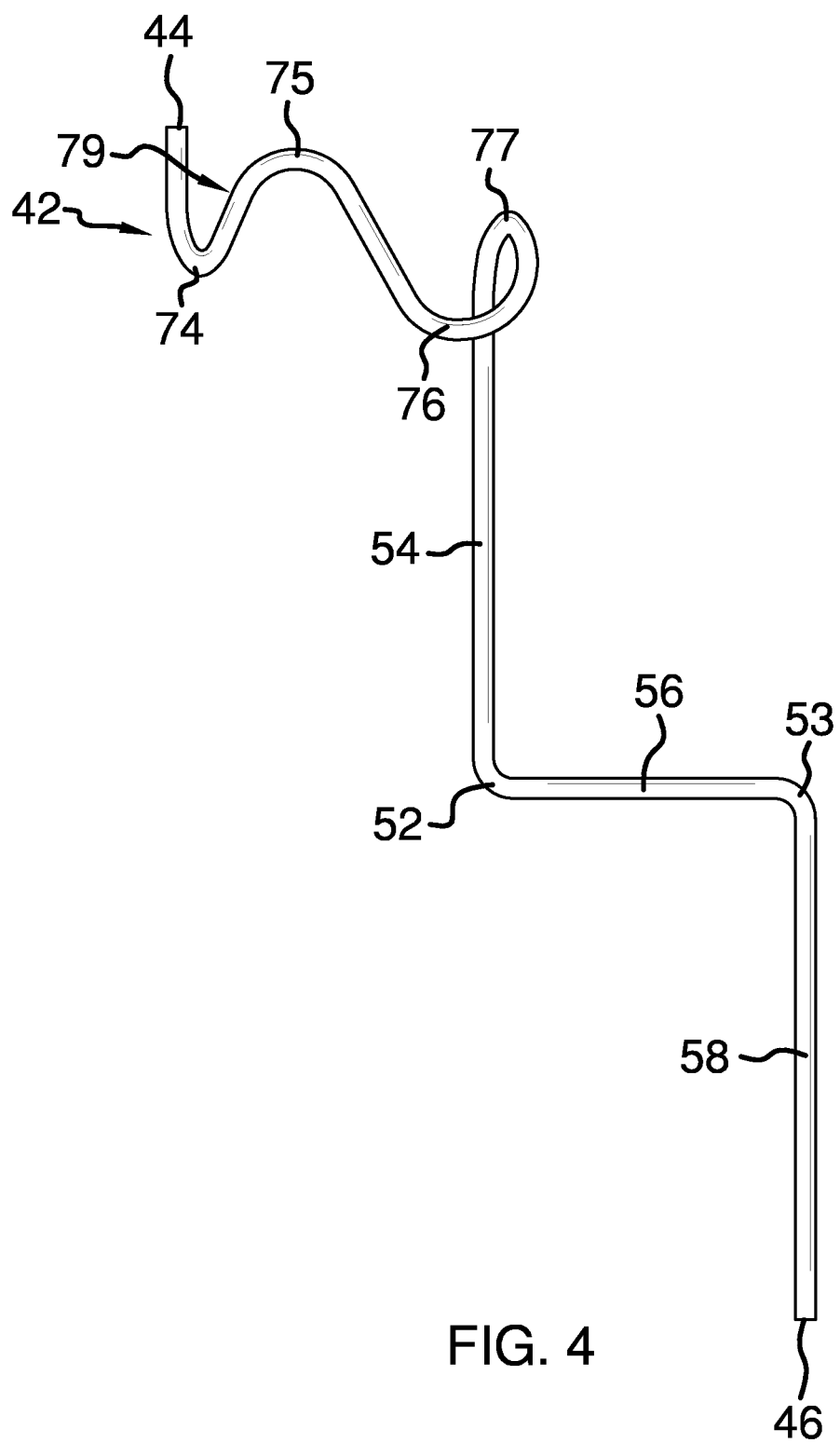
FIG. 4 is a front view of a holding member of an embodiment of the disclosure.

With reference now to the drawings, and in particular to FIGS. 1 through 5 thereof, a new fishing pole support embodying the principles and concepts of an embodiment of the disclosure and generally designated by the reference numeral 10 will be described.

Figure 5:
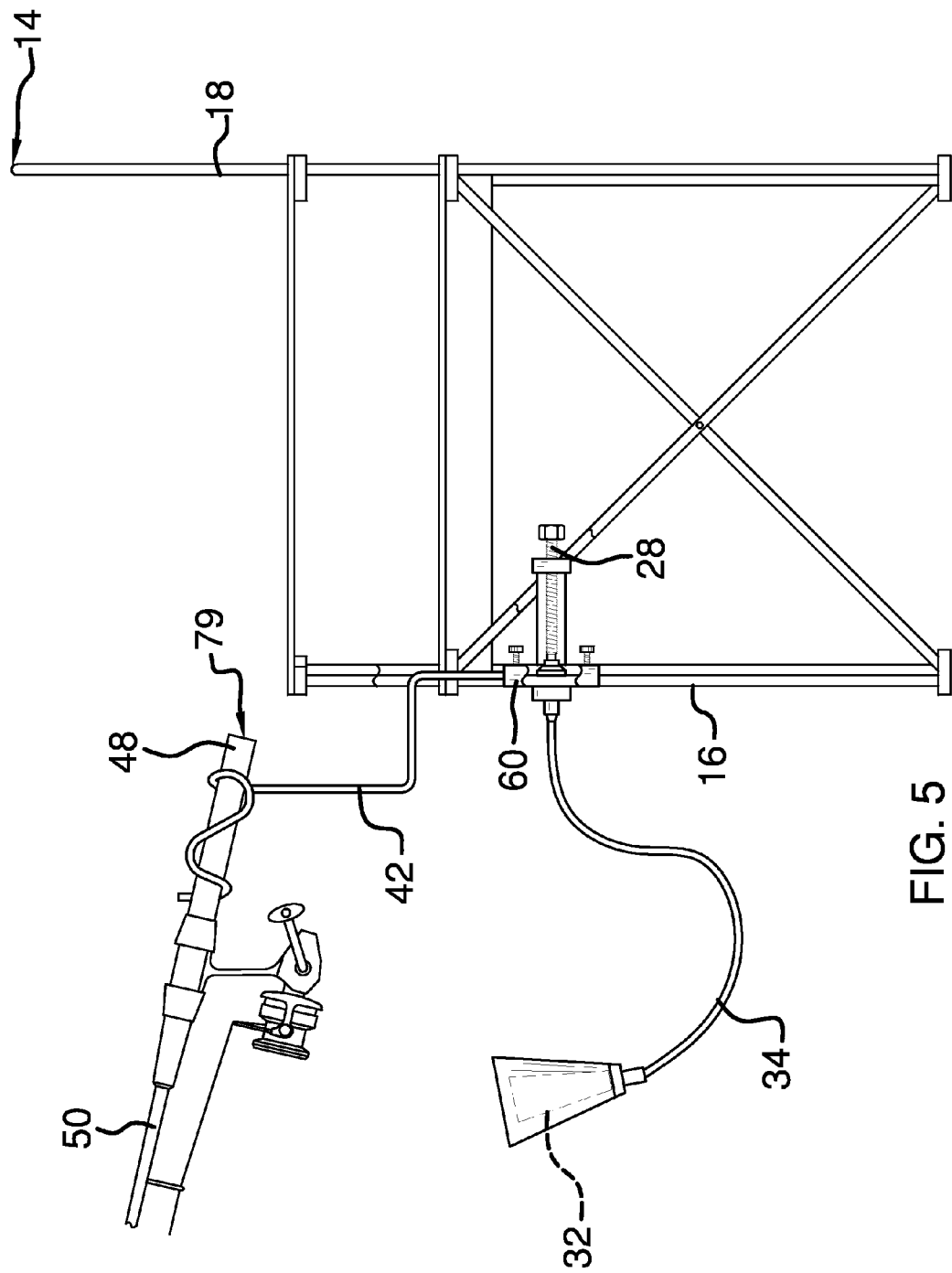
FIG. 5 is a front view of an embodiment of the disclosure in use.

As best illustrated in FIGS. 1 through 5, the fishing pole holder assembly 10 generally comprises a clamp 12 configured for coupling to a support structure 14, such as a rail on a boat or a leg 16 of a chair 18 as shown in FIG. 5. The clamp 12 may be generally conventional and include a first bar 20, a second bar 22 and a third bar 24 wherein the second bar 22 is coupled to and extends between the first bar 20 and the second bar 22. The first 20 and third 24 bars are parallel to each other and perpendicular to the second bar 22. The first 20 and third 24 bars extend away from the second bar 22 in a same direction relative to each other. One of the first bar 20 and the third bar 24 has an aperture 26 positioned therein configured for receiving a connector 28 therethrough. The connector 28 may include a threaded nut and bolt or the like.

A light assembly 30 includes a light emitter 32 and may also include an elongated neck 34. The elongated neck 34 is coupled to the clamp 12. The light emitter 32 is coupled to a distal end 36 of the elongated neck 34 with respect to the clamp 12. The elongated neck 34 may be flexible for allowing the light emitter 32 to be positioned at a selectable angle relative to the clamp 12. A power source 38 is attached to the clamp 12 and is electrically coupled to the light emitter 32 for providing electrical power to the light emitter 32. The power source 38 may be positioned within the clamp 12. An actuator 40 is coupled to the clamp 12 and is operationally coupled to the light emitter 32 wherein manipulation of the actuator 40 selectively actuates the light emitter 32.

A holding member 42 is provided having a first end 44 and a second end 46. The second end 46 of the holding member 42 is attached to the clamp 12. The holding member 42 is tubular. The holding member 42 includes a plurality of upper bends 74, 75, 76, 77 proximate the first end 44 of the holding member 42. The upper bends 74, 75, 76, are positioned to 77 form a channel 79 configured to receive and support a handle 48 of a fishing pole 50 therein. The holding member 42 may also include a pair of lower bends 52, 53. Each of the lower bends 52, 53 is positioned between the second end 46 of the holding member 42 and the plurality of upper bends 74, 75, 76, 77. The lower bends 52, 53 define a first section 54, a second section 56 and a third section 58 of the holding member 42 wherein the second section 56 is coupled to and extends between the first section 54 and the third section 58. The second section 56 may be orientated perpendicularly relative to first section 54 and the third section 58. The first section 54 and the third section 58 may extend away from the second section 56 in opposite directions relative to each other. Upper bend 77 extends from the first section 54 and curves downwardly and inwardly in a direction toward the clamp 12. Upper bend 76 is positioned adjacent to upper bend 77 and curves upwardly and outwardly in a direction away from the clamp 12. Upper bend 75 is positioned adjacent to upper bend 76 and curves downwardly and inwardly in a direction toward the clamp 12. Upper bend 74 is positioned adjacent to the upper bend 75 and curves upwardly toward the first end 44 of the holding member 42. The first end 44 of the holding member 42 is spaced above each of the upper bends 74, 75, 76, 77.

A mount 60 is attached to the clamp 12. The mount 60 has a top end 62, a bottom end 64 and a perimeter wall 66 coupled to and extending between the top end 62 and the bottom end 64. The mount 60 has a channel 68 extending therein between the top end 62 and the bottom end 64 of the mount 60. The second end 46 of the holding member 42 is positioned within the channel 68. The perimeter wall 66 of the mount 60 has a plurality of holes 70, 71 positioned therein. A plurality of fasteners 72, 73 such as thumb screws or the like, is provided. Each of the fasteners 72, 73 extends through an associated one of the holes 70, 71 and frictionally engages the holding member 42 to retain the holding member 42 within the channel 68.

The second section 56 of the holding member 42 may have a length between approximately 4.5 cm and 10.0 cm as measured between the first section 54 and the third section 58. The third section 58 and the first section 54 of the holding member 42 may each have a length between approximately 10.0 cm and 15.0 cm. The elongated neck 42 of the light assembly 30 may have a length between approximately 60.0 cm and 90.0 cm.

In use, as stated above and shown in the Figures, the clamp 12 is used to attach the assembly 10 to a support structure 14, such as a leg 16 of a chair 18. The fasteners 72, 73 are used to adjust the relative height of the holding member 42 relative to a ground surface. The curvature and positioning of the upper bends 74, 75, 76, 77 permit a handle 48 of a fishing pole 50 to be positioned on and supported by the holding member 42. In this manner, the assembly 10 ensures that the fishing pole 50 is readily accessible and prevents the user from having to bend over to access the fishing pole 50. The light emitter 32 can be actuated to turn on the light emitter 32 if desired.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A fishing pole holder assembly comprising:
   a clamp configured for coupling to a support structure; and
   a holding member having a first end and a second end, said second end of said holding member being attached to said clamp, said holding member being tubular, said holding member including a plurality of upper bends proximate said first end of said holding member, said upper bends being positioned to form a channel configured to receive and support a handle of a fishing pole therein, wherein said holding member includes at least one lower bend positioned between said second end of said holding member and said plurality of upper bends;
   a light assembly coupled to said clamp, said light assembly including a light emitter, said light assembly further including an elongated neck coupled to said clamp, said light emitter being coupled to a distal end of said elongated neck with respect to said clamp, said elongated neck being flexible for allowing said light emitter to be positioned at a selectable angle relative to said clamp;
   a mount attached to said clamp, said mount having a top end, a bottom end and a perimeter wall coupled to and extending between said top end and said bottom end, said mount having a channel extending between said top end and said bottom end of said mount, said second end of said holding member being positioned within said channel, said perimeter wall of said mount having a plurality of holes positioned therein; and
   a plurality of fasteners, each of said fasteners extending through an associated one of said holes and frictionally engaging said holding member to retain said holding member within said channel.

2. The assembly of claim 1, further comprising a power source attached to said clamp and being electrically coupled to said light emitter for providing electrical power to said light emitter.

3. The assembly of claim 2, further comprising said power source being positioned within said clamp.

4. The assembly of claim 1, further comprising an actuator coupled to said clamp and being operationally coupled to said light emitter wherein manipulation of said actuator selectively actuates said light emitter.

5. The assembly of claim 1, further comprising said lower bend comprising a pair of said lower bends, each of said lower bends being positioned between said second end of said holding member and said plurality of upper bends, said lower bends defining a first section, a second section and a third section of said holding member wherein said second section is coupled to and extends between said first section and said third section.

6. A fishing pole holder assembly comprising:
   a clamp configured for coupling to a support structure;
   a light assembly including a light emitter and an elongated neck, said elongated neck being coupled to said clamp, said light emitter being coupled to a distal end of said elongated neck with respect to said clamp, said elongated neck being flexible for allowing said light emitter to be positioned at a selectable angle relative to said clamp;
   a power source attached to said clamp and being electrically coupled to said light emitter for providing electrical power to said light emitter, said power source being positioned within said clamp;
   an actuator coupled to said clamp and being operationally coupled to said light emitter wherein manipulation of said actuator selectively actuates said light emitter;
   a holding member having a first end and a second end, said second end of said holding member being attached to said clamp, said holding member being tubular, said holding member including a plurality of upper bends proximate said first end of said holding member, said upper bends being positioned to form a channel configured to receive and support a handle of a fishing pole therein, said holding member including a pair of lower bends, each of said lower bends being positioned between said second end of said holding member and said plurality of upper bends, said lower bends defining a first section, a second section and a third section of said holding member wherein said second section is coupled to and extends between said first section and said third section, said second section being orientated perpendicularly relative to first section and said third section, said first section and said third section extending away from said second section in opposite directions relative to each other;
   a mount attached to said clamp, said mount having a top end, a bottom end and a perimeter wall coupled to and extending between said top end and said bottom end, said mount having a channel extending between said top end and said bottom end of said mount, said second end of said holding member being positioned within said channel, said perimeter wall of said mount having a plurality of holes positioned therein; and
   a plurality of fasteners, each of said fasteners extending through an associated one of said holes and frictionally engaging said holding member to retain said holding member within said channel.

* * * * *